(12) United States Patent
Chang

(10) Patent No.: US 10,531,375 B2
(45) Date of Patent: Jan. 7, 2020

(54) TRANSMISSION MECHANISM SELECTION FOR POINT TO MULTIPOINT (PTM) COMPATIBLE SERVICES USING SERVING CELL INFORMATION

(71) Applicant: Kyocera Corporation, Kyoto (JP)

(72) Inventor: Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 65 days.

(21) Appl. No.: 15/543,012

(22) PCT Filed: Jan. 29, 2016

(86) PCT No.: PCT/US2016/015772
§ 371 (c)(1),
(2) Date: Jul. 12, 2017

(87) PCT Pub. No.: WO2016/123547
PCT Pub. Date: Aug. 4, 2016

(65) Prior Publication Data
US 2018/0014246 A1 Jan. 11, 2018

Related U.S. Application Data

(60) Provisional application No. 62/110,159, filed on Jan. 30, 2015.

(51) Int. Cl.
*H04W 48/18* (2009.01)
*H04W 76/40* (2018.01)
*H04W 4/06* (2009.01)

(52) U.S. Cl.
CPC ............. *H04W 48/18* (2013.01); *H04W 4/06* (2013.01); *H04W 76/40* (2018.02)

(58) Field of Classification Search
CPC ........ H04W 48/18; H04W 76/40; H04W 4/06
See application file for complete search history.

(56) References Cited

U.S. PATENT DOCUMENTS

| | | | | |
|---|---|---|---|---|
| 9,025,481 | B2* | 5/2015 | Gao ...................... | H04L 1/0026 370/252 |
| 2006/0187866 | A1* | 8/2006 | Werb ...................... | G01D 4/004 370/311 |

(Continued)

FOREIGN PATENT DOCUMENTS

| WO | WO 2008-155741 A2 | 12/2008 |
|---|---|---|
| WO | WO 2013-011375 A2 | 1/2013 |

OTHER PUBLICATIONS

Alcatel-Lucent; "E-MBMS transmission mode selection and switching", R3-070936; 3GPP TSG-RAN WG3 #56; May 7-11, 2007; Kobe, Japan.

(Continued)

*Primary Examiner* — Hashim S Bhatti
*Assistant Examiner* — Abdullahi Ahmed

(57) ABSTRACT

A network selects a transmission mechanism for delivering a Point to Multipoint (PTM) compatible service based on cell identification (cell ID) information identifying the serving cells of user equipment (UE) devices interested in receiving the PTM compatible service. In some situations, the cell ID information is obtained by the network using a Multimedia Broadcast Multicast Service (MBMS) counting procedure where cell ID information is requested in a MBMS Counting Request Message and provided by each UE device in a MBMS Counting Response Message.

21 Claims, 7 Drawing Sheets

(56) References Cited

U.S. PATENT DOCUMENTS

| | | | |
|---|---|---|---|
| 2008/0316952 A1 | 12/2008 | Gruber et al. | |
| 2010/0091673 A1* | 4/2010 | Sawai | H04L 5/0053 370/252 |
| 2010/0189027 A1* | 7/2010 | Ishida | H04W 48/12 370/312 |
| 2010/0265880 A1* | 10/2010 | Rautiola | H04L 29/12311 370/328 |
| 2011/0066297 A1* | 3/2011 | Saberi | F16K 31/046 700/287 |
| 2011/0116362 A1* | 5/2011 | Singatwaria | H04J 3/14 370/216 |
| 2011/0149783 A1* | 6/2011 | Zhang | H04W 4/06 370/252 |
| 2012/0033605 A1* | 2/2012 | Yang | H04W 72/005 370/312 |
| 2012/0182921 A1* | 7/2012 | Tsuboi | H04W 4/021 370/312 |
| 2013/0016645 A1* | 1/2013 | Moriwaki | H04L 12/185 370/312 |
| 2013/0107773 A1 | 5/2013 | Chang | |
| 2013/0170421 A1* | 7/2013 | Wang | H04W 4/06 370/312 |
| 2013/0242965 A1* | 9/2013 | Horn | H04W 24/10 370/338 |
| 2013/0286926 A1 | 10/2013 | Zhang et al. | |
| 2014/0376432 A1* | 12/2014 | Smith | H04W 52/0206 370/311 |
| 2015/0036494 A1* | 2/2015 | Kotecha | H04W 4/06 370/235 |
| 2015/0124686 A1* | 5/2015 | Zhang | H04W 76/40 370/312 |
| 2015/0131510 A1* | 5/2015 | Gilbert | H04W 72/005 370/312 |

OTHER PUBLICATIONS

Vodafone; "Proposed concept for eMBMS congestion management", R3-142423; 3GPP TSG RAN WG3 Meeting #85bis; Oct. 6-10, 2014; Shanghai, China.

* cited by examiner

TRANSMISSION MECHANISM SELECTION FOR POINT TO MULTIPOINT (PTM) COMPATIBLE SERVICES USING SERVING CELL INFORMATION

RELATED APPLICATIONS

This application claims the benefit of priority of U.S. provisional patent application Ser. No. 62/110,159, entitled "Selection of SC-PTM Transmission", filed on Jan. 30, 2015, and incorporated in its entirety herein.

FIELD

This invention generally relates to wireless communications and more particularly to selection transmission mechanisms for Point To Multipoint (PTM) compatible services.

BACKGROUND

Multimedia Broadcast Multicast Service (MBMS) is a Point-to-Multipoint (PTM) interface specification designed to provide efficient delivery of broadcast and multicast services within 3rd Generation Partnership Project (3GPP) cellular networks. Examples of MBMS interface specifications include those described in Universal Mobile Telecommunications System (UMTS) and Long Term Evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside an MBSFN (Multimedia Broadcast multicast service Single Frequency Network) area transmit the same MBMS service.

Users access these services and obtain the MBMS content through wireless communication devices such as cellular phones, tablets, laptops, and other devices with wireless transceivers that communicate with the base stations within the communication system. The base stations, sometimes referred to as eNodeBs or eNBs, provide wireless services to the wireless communication devices, sometimes referred to as user equipment (UE), within cells.

A user can access at least some multimedia services through a UE device using either a Point-to-Point (PTP) connection or a Point-to-Multipoint (PTM) transmission. In 3GPP systems, PTP services can be provided using Unicast techniques and PTM transmissions can be provided using MBMS communication, transmitted over a Multicast Broadcast Single Frequency Network (MBSFN) or Single Cell-Point to Multipoint (SC-PTM) communication. In systems operating in accordance with a revision of 3GPP Long Term Evolution (LTE) communication specification, MBMS is provided using eMBMS. Accordingly, a PTM compatible service can be provided using either Unicast service, MBSFN or SC-PTM in an LTE system.

SUMMARY

A network selects a transmission mechanism for delivering a Point to Multipoint (PTM) compatible service based on cell identification (cell ID) information identifying the serving cells of user equipment (UE) devices interested in receiving the PTM compatible service. In some situations, the cell ID information is obtained by the network using a Multimedia Broadcast Multicast Service (MBMS) counting procedure where cell ID information is requested in a MBMS counting request message and provided by each UE device in a MBMS counting response message.

DETAILED DESCRIPTION

Figure 1A:
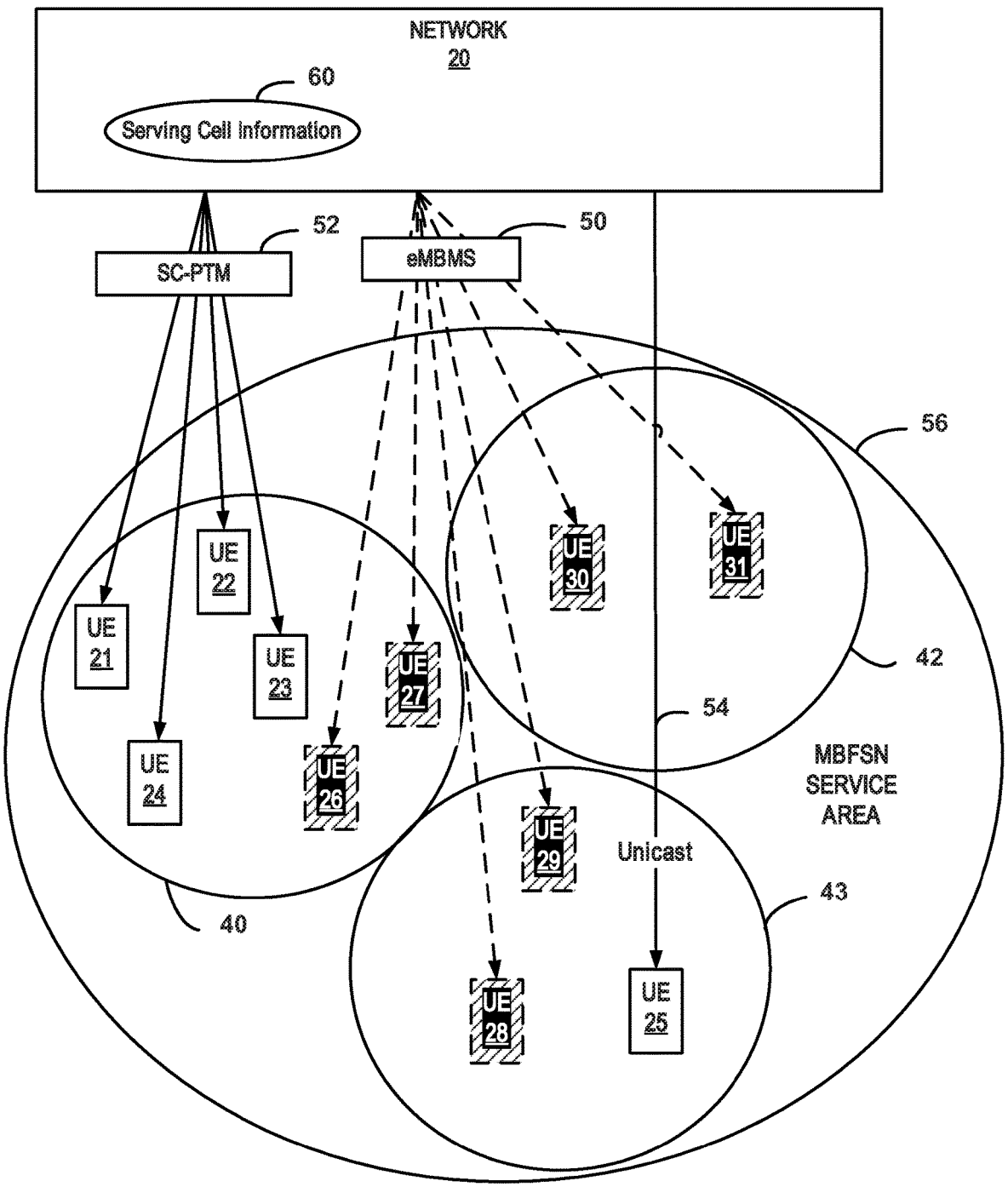
FIG. 1A is a block diagram of a communication system that is capable of providing Multimedia Broadcast Multicast Service (MBMS) to user equipment (UE) devices.

FIG. 1A is a block diagram of a communication system 10 capable of providing Point-to-Multipoint (PTM) compatible services/content to user equipment (UE) devices through a plurality of transmission mechanisms. The communication system 10 includes a network 20 which provides various wireless services to the plurality of UE devices 21-25 within a plurality of service cells 40, 42, 44. The network 20 typically includes an Evolved Universal Mobile Telecommunications System Terrestrial Radio Access Network (E-UTRAN), a core network such as an Evolved Packet Core (EPC), Packet Data Networks (PDN), and servers such as Group Call System-Application Server (GCS-AS). In the interest of clarity and brevity, FIG. 1 shows a limited number of UE devices within three cells 40, 42, 44. The cells are represented by circles although a typical system 10 has numerous cells having variously shaped geographical service areas. As discussed herein, a PTM compatible service is any combination of data, communication, service, and/or content that can be provided by PTM techniques. In most situations, the PTM compatible service can be provided by Multimedia Broadcast Multicast Service (MBMS) over a Multicast Broadcast Single Frequency Network (MBSFN), Single Cell Point to Multipoint (SC-PTM) service and/or Unicast service using point to point (PTP) techniques. Some examples of PTM compatible services include mobile TV, news, radio broadcasting, file delivery, emergency alerts, as well as others. For the examples herein, the communication system 10 operates in accordance with at least one revision of the 3rd Generation Partnership Project Long Term Evolution (3GPP LTE) communication specification and can provide PTM compatible services using at least MBMS (MBMS) over a MBSFN 50 such as enhanced MBMS (eMBMS), SC-PTM 52, and Unicast 54. Other mechanisms may be used in some circumstances. Accordingly, the system supports a Multicast-broadcast single-frequency network (MBSFN) in an MBSFN service area 56 where a PTM compatible service is provided using an eMBMS transmission mechanism 50 through the MBSFN. In addition, the network 20 can provide the PTM compatible service via a SC-PTM transmission mechanism 52 where the PTM compatible service is transmitted only within one or more selected cells rather than broadcast throughout the entire MBSFN area. In some situations, eMBMS can be provided using SC-PTM. As discussed below, using one of the transmission mechanisms to provide a particular PTM service may result in a more efficient use of communication resources depending on the distribution of the UE devices interested in the particular PTM service.

The network 20 obtains serving cell information 60 identifying the serving cell of each UE device interested in receiving a particular PTM compatible service. In some examples, the network 20 in the 3GPP LTE communication system 10 selects a transmission mechanism for the PTM service based on serving cell identification information provided in MBMS counting response messages. One or more entities within the network 10 evaluate the serving cell information of the UE devices interested in a particular PTM service. Based on the distribution of the UE devices, the one or more entities determine how to provide the service to each UE device. For example, where all, or a vast majority of UE devices, are within a single cell service area, the network may decide to provide the PTM compatible service to those UE devices using a SC-PTM transmission mechanism. On the other hand, if a significantly large number of UE devices interested in the same PTM services are distributed over several cells within the MBSFN service area, the PTM service may be delivered using MBMS through the MBSFN. In some situations, Unicast or other PTP transmission mechanisms may be selected. For the examples of FIG. 1A, FIG. 1B and FIG. 1C, a first set of UE devices 21-25 interested in a first PTM compatible service are distributed primarily within a single cell 40. Accordingly, the network determines from the serving cell information 60 that UE devices 21-24 are within the single cell 40 and that one UE device 25 is in a second cell 43. The network 20 determines that the first PTM compatible service should be provided by SC-PTM 52 by the single cell 40. Other UE devices interested in the first PTM compatible service, such as the UE device 25, may acquire the PTM compatible service using SC-PTM provided by their serving cell or, as shown in FIG. 1A, by a PTP transmission mechanism such as Unicast 54. For the example of FIG. 1A, such selection of the transmission mechanisms is more efficient than using MBMS over MBSFN since, if MBMS over MBSFN is used to provide the service, the MBMS resources would be used in cells where there are few or no UE devices receiving the PTM compatible service. On the other hand, where the UE devices interested in the PTM compatible service are distributed over multiple cells (such as UE devices 26-31 in FIG. 1A), the network determines that the PTM compatible service should be provided by MBMS over MBSFN 50.

Figure 1B:
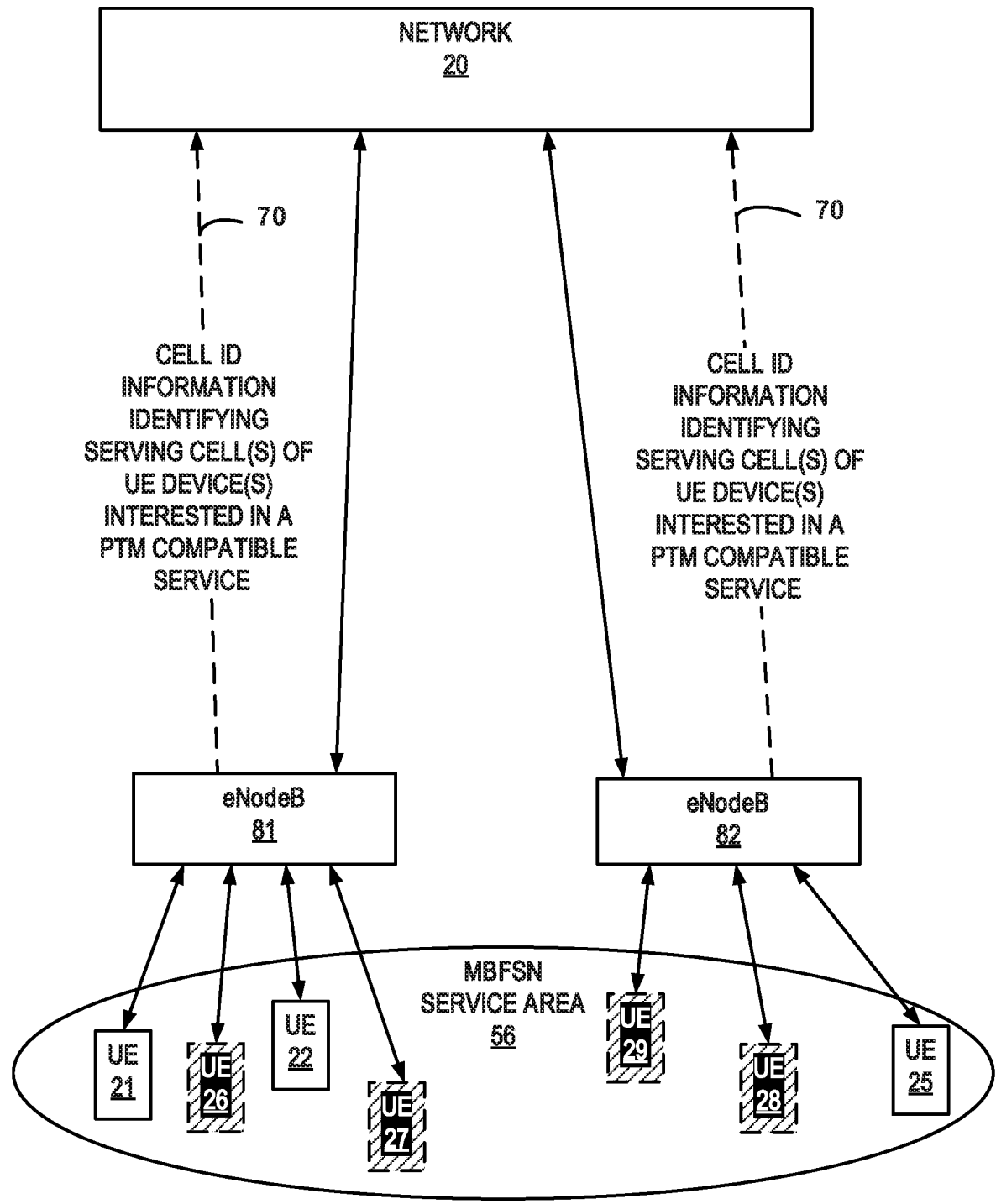
FIG. 1B is a block diagram of the communication system for an example where cell identification information is sent from the eNodeBs.

FIG. 1B is a block diagram of the communication system 10 for an example where cell identification information is sent from the eNodeBs. The MBMS communication system 100 includes several base stations sometimes referred to as eNodeBs or eNBs (81, 82), that communicate with the wireless communication devices (UE devices) 21-31 by transmitting downlink signals and receiving uplink signals transmitted from the UE devices 21-31. The UE devices 81, 82 are any wireless communication devices such as mobile phones, transceiver modems, personal digital assistants (PDAs), and tablets, for example.

The eNodeBs 81, 82 are connected to the network 20 through a backhaul in accordance with known techniques. The communication system 10 provides PTM services by transmitting the PTM compatible service through multiple eNodeBs using SC-PTM and MBMS over MBSFN techniques.

For the example, each eNodeB sends one or more messages including information (cell ID information) 70 that allows the network 20 to determine the number of UE devices in each cell that are interested in a particular PTM compatible service. The cell ID information 70 may be provided over different layers, signaling, and messages depending on the particular implementation. In some situations, each eNodeB is instructed by an entity within the network to perform an inquiry of the UE devices it services to determine which UE devices are interested in a particular PTM compatible service. For example, a Broadcast Multicast Service Center (BM-SC) may instruct the E-UTRAN to question each UE device whether it is interested in a PTM compatible service. Using system information, the E-UTRAN then sends a Temporary Mobile Group Identity (TMGI) request to each UE device requesting the UE device to indicate TMGIs of interest. Each UE device indicates the one or more TMGIs of interest and the E-UTRAN reports the results to the BM-SC. For such an implementation, each eNodeB 81, 82 communicates with the UE devices that it is serving to identify the TMGIs of interest. Each eNodeB 81, 82 sends the cell ID information to the network 20. In such a situation, the UE devices do not need to report any serving cell information since each eNodeB 81, 82 is providing the cell information for the UE devices that are responding.

In other examples, as discussed below, the cell ID information 70 is provided within counting response messages to the eNodeBs which forward the cell ID information to the network within a counting results reports. In order for the network to receive reception status feedback from the wireless communication devices (UEs), the current 3GPP specifications specify Counting Procedures. A Counting Procedure is initiated by the network. A Multi-cell/multicast Coordination Entity (MCE) in the network sends a request to each eNodeB providing the specific PTM compatible service in the MBSFN area (or capable of providing the PTM compatible service) to send a Counting Request to the wireless communication devices (UEs). The Counting Request typically contains a list of specific PTM compatible service identifiers requiring wireless communication device (UE) feedback. The connected mode wireless communication devices (UEs) which are receiving or interested in receiving the identified content, respond with a Counting Response message including the specific PTM compatible service identifiers that are of interest. For the examples discussed below, the conventional counting procedures are modified to include cell identity indicators and identifiers that allow the network to request, and the UE devices to provide, the cell identification information identifying the serving cell of each UE device interested in at least one PTM compatible service.

Figure 1C:
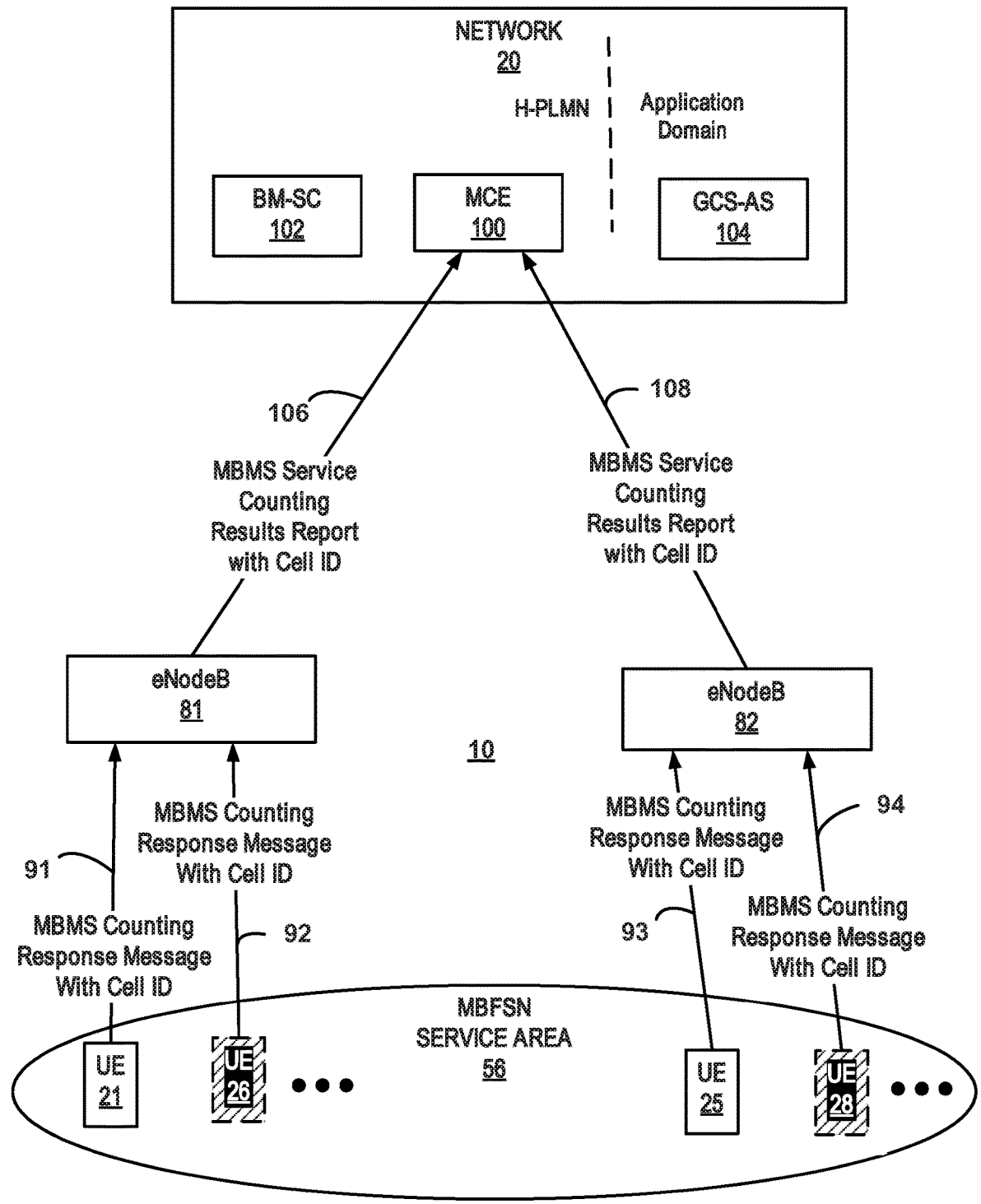
FIG. 1C is a block diagram of the communication system for an example where the cell ID information is provided within MBMS counting request response messages transmitted by the UE devices.

FIG. 1C is a block diagram of the communication system 10 for an example where the cell ID information 70 is provided within MBMS counting request response messages 90, 91, 92, 93 transmitted by the UE devices 21-31. As discussed below, the network 20 includes a Multi-cell/multicast Coordination Entity (MCE) 100, BM-SC 102 and a Group Call System Application Server GCS-AS 104. The MCE 100 manages MBMS communications by exchanging information and instructions with the eNodeBs 81, 82. The MCE 100 is typically a logical network entity that is implemented over several devices or network elements within the network/system. The MCE 100, however, may be implemented within a single device or network element in some circumstances. The MCE 100 performs functions such as admission control and allocation of radio resources for the MBMS Single Frequency Network (MBSFN) area 56 for multicell-MBMS. In managing the MBMS communications, the MCE 100 invokes counting procedures and acquires counting results for one or more PTM compatible services. Based on the counting procedure results and possibly other factors, the MCE 90 determines whether a PTM session should be suspended, established, and resumed. A MBMS session is a session where a PTM compatible service is multicast from the eNodeBs 81, 82. Other than the modified counting procedures and transmission mechanism selection procedures described herein, the MCE 100 operates in accordance with one or more current 3GPP LTE specifications to perform these tasks for the examples described herein.

The Broadcast Multicast Service Center (BM-SC) 102 is a network entity within the control plane that is responsible for authentication, content authorization, billing, and configuration of the data flow through the core network. It acts as a proxy content server and facilitates membership, session and transmission, proxy and transport, service announcement, security, and content synchronization.

The GCS-AS 104 is an application server that provides the content for the PTM compatible service. The GCS AS is the entity which makes the decision to use either unicast or broadcast mode for sending traffic (voice, video or data) to the public safety devices. This entity is connected to the network 20. For the purposes of supporting SC-PTM, the GCS AS may also request cell identity information from UEs, but the information updated through this application layer (over GC1 interface) is not dynamic and needs to be shared with the MCE in a timely manner since it's the MCE that ultimately decides which version of PTM should be used for transmission.

In response to MBMS service counting request received from the MCE 100, the eNB 81 and the eNB 82 send MBMS counting request messages to the UE devices 21-31. For the examples herein, the MBMS service counting requests and the MBMS counting request messages include a cell identity indicator indicating that the UE devices should provide the cell ID of their serving cell. In some situations, the cell identity indicator is a generic indicator that only informs the UE device to provide cell ID information. In other situations, the cell identity indicator identifies specific cells for which the MCE is specifically requesting information. In some situations, the cell identity indicator can be omitted. For example, the UE device may be configured to provide cell ID information in response to the MBMS counting request. Such a situation, may be useful where the MBMS counting request is sent through SC-PTM. Each UE device responds in a MBMS counting response message 90, 91, 92, 93 that includes the cell ID of its serving cell. Each eNB 81, 82 generates and sends an MBMS counting results report message 106, 108 indicating cell ID information for each PTM compatible service. Therefore, the MBMS counting results report 106 from one eNB 81 includes information indicating the serving cell of the UE devices 21, 26 that are interested in each PTM compatible service. For the example, UE devices such as UE device 21 indicate the cell ID of the first cell 40 and indicate a first TMGI and UE devices such as UE device 26 indicate the cell ID of the first cell 40 and indicate the a second TMGI. Similarly, the MBMS counting response message 93 from UE devices such as UE device 25 indicate the cell ID of the third cell 43 and indicate the first TMGI while UE devices such as UE device 28 indicate the cell ID of the third cell 43 and indicate the a second TMGI. The eNBs 81, 82 send MBMS service counting results reports 106, 108 indicating the UE devices interested in the first and second TMGI and the cell ID of their serving cells. Based on the information in the MBMS service counting results reports 106, 108, the MCE 100 and the BM-SC determine the distribution and numbers of UE devices interested in the different PTM compatible services (TMGIs) and select a transmission mechanism for each TMGI. In some situations, the GCS-AS 104 may be at least partially involved in the selection of the transmission mechanism. As discussed below, the UE devices may identify multiple cells where the reported cells may include the primary serving cell and secondary cells. In some situations, the UE device may report non-serving cells in addition to serving cells. Where a UE device is monitoring a cell but not receiving service on the cell, it may be useful to provide the cell information. Such a situation may occur where a UE device is receiving service on one or more cells of an eNodeB while monitoring another, accessible cell of the same eNodeB.

For the example, therefore, the MCE 100 sends an MBMS Service Counting Request to all eNBs in the MBSFN area. In response, the eNBs sends MBMS Counting Request messages to the UEs within the eNB service areas. The MBMS Service Counting Request and the MBMS Counting Request messages include a Cellular identity information element (Cell ID IE) that indicates that the UE devices should provide the cellular identify of their serving cell when responding to the MBMS Counting Request message. Each UE device sends the MBMS Counting Response message in response to the MBMS Counting Request message received from its serving eNB where the MBMS Counting Response message includes the cellular ID of its serving cell. Each eNB 81, 82 generates an MBMS Service Counting Results Report 106, 108 that includes the cellular identify information received from eNBs. The MBMS Service Counting Results Report is forwarded to the MCE which evaluates the MBMS Service Counting Results Reports received from the eNBs. For the examples herein, the MBMS Service Counting Request, the MBMS Counting Request message, the MBMS Counting Response message, and the MBMS Service Counting Results Report are generated and formatted in accordance with at least one revision of the 3GPP LTE communication specification except that they each include a cellular identity information element (cell ID IE). As a result, the information provided to the MCE 100 includes the information indicating at least the number of UE devices in each cell that are interested in receiving a particular MBMS service. Based on at least this information, the MCE selects a transmission mechanism for providing the MBMS a service. In some situations, the MCE selects between eMBMS and Single Cell-Point to Multi-point (SC-PTM) transmission mechanisms. Such a technique facilitates more efficient use of communication resources since SC-PTM is used instead of eMBMS in situations where the UE devices are receiving the particular service in one cell or very few cells within an MBSFN area. As discussed below, the technique can be expanded to select other transmission mechanisms in some situations. For example, it may be more efficient to provide the service using Unicast where only a few UE devices are interested in the service especially if these UE devices are located in different cells. Other entities within the network 20 may evaluate the MBMS Service Counting Results Report and select a transmission mechanism for providing the MBMS content. For example, the GCS-AS 104 in conjunction with the BM-SC 102 and the MCE 100 may evaluate the reports and select the transmission mechanism.

Figure 2:
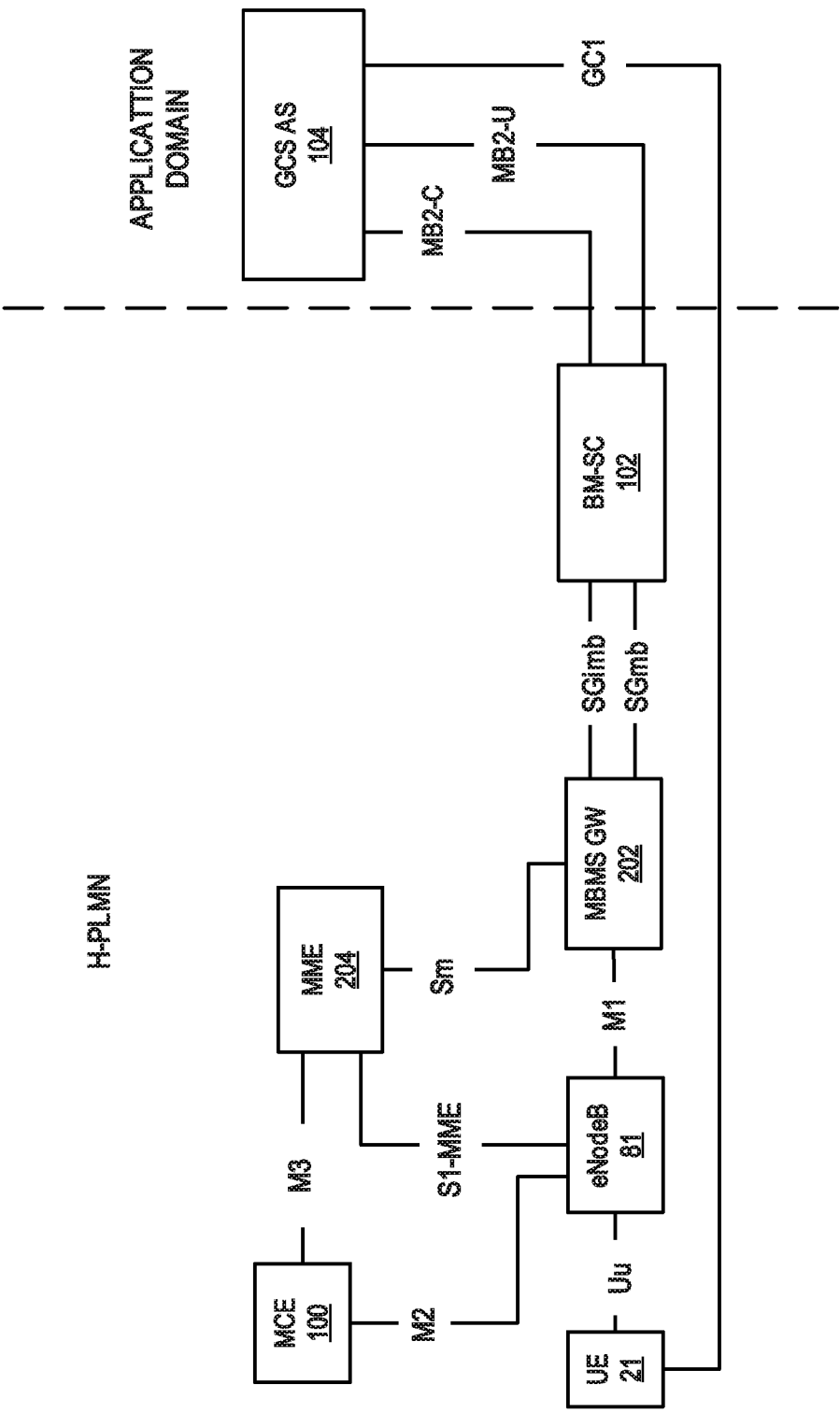
FIG. 2 is block diagram of the communication system illustrating some of the network entities within a 3GPP LTE system.
Figure 3:
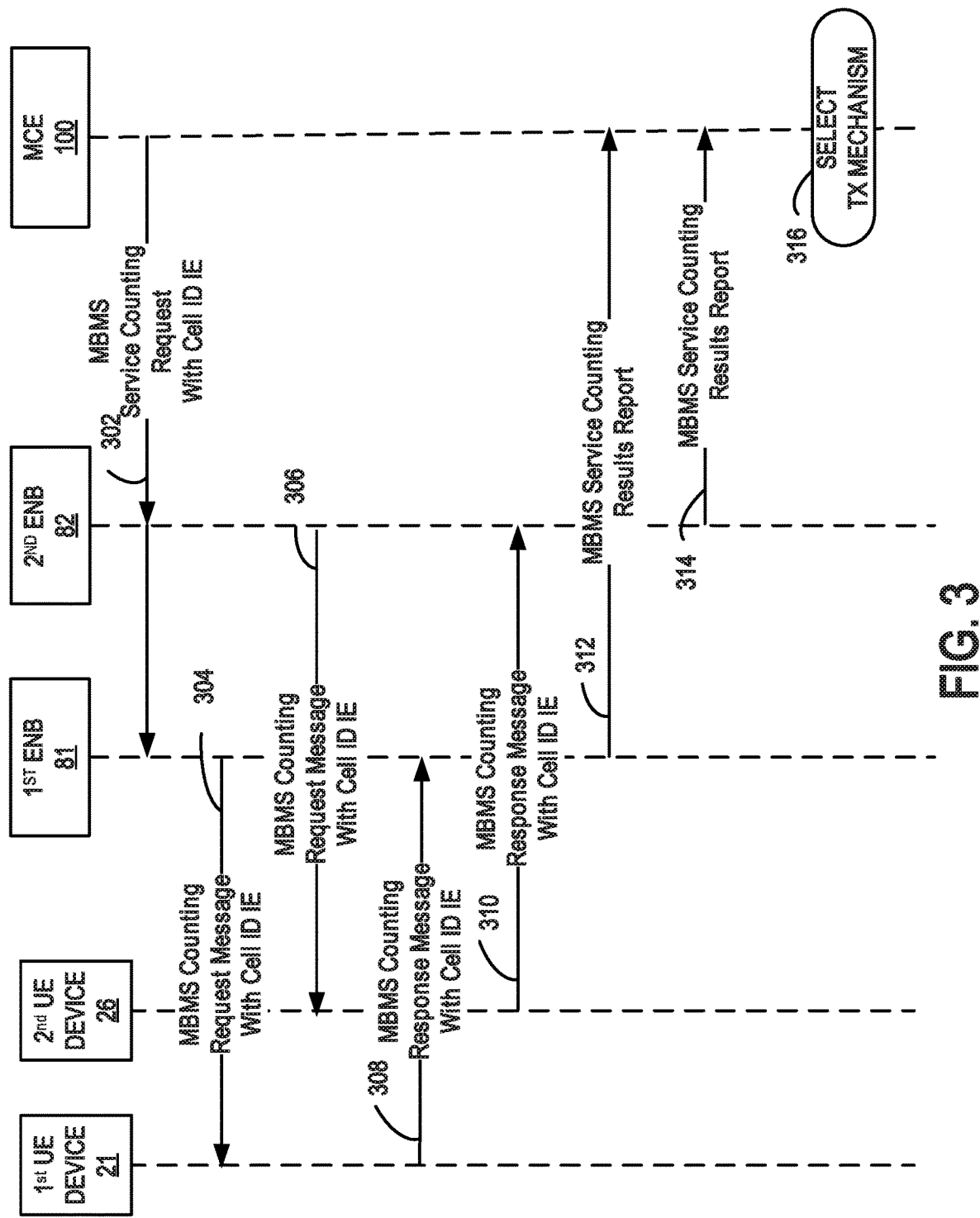
FIG. 3 is a message diagram for the example where the cell ID information is provided by the UE devices in the MBMS counting response message.

FIG. 2 is a block diagram of the communication system 10 illustrating some of the network entities within a 3GPP LTE system. 3GPP LTE systems typically employ additional entities and functions that are well known in the art. In the interest of clarity and brevity, these additional entities are omitted from FIG. 2. The Broadcast-Multicast Service Center (BM-SC) 102 is an entity that provides functions for MBMS user service provisioning and delivery. It may serve as an entry point for content provider MBMS transmissions, used to authorize and initiate MBMS Bearer Services within the PLMN and can be used to schedule and deliver MBMS transmissions. The BM-SC consists of sub-functions such as membership, session and transmission, service announcement, security and content synchronization for MBMS in E-UTRAN for broadcast mode. The MBMS GW 202 allocates an IP Multicast Address based on the TMGI and Flow Identifier. MBMS GW 202 can communicate with multiple control-plane entities (i.e., MME and BM-SCs). MBMS GW functions also include an interface for entities using MBMS bearers through the SGi-mb (user plane) reference point and the SGmb (control plane) reference point. The MME 204 supports several functions in order to enable MBMS support for the E-UTRAN. The MME 204 provides an Sm interface to the MBMS GW 202 by receiving MBMS service control messages and the IP Multicast address for MBMS data reception from the MBMS GW over the Sm interface. The MME 204 further executes session control of MBMS bearers to the E-UTRAN access (including reliable delivery of Session Start/Session Stop to E-UTRAN). The MME 204 also transmits Session control messages towards multiple E-UTRAN nodes. When connected to multiple MCEs, the MME 204 should filter the distribution of Session Control messages to the MCEs based on the MBMS service area. The MME 204 provisions the list of MBMS Service Areas served by the MCE to the MME using M3AP Setup signaling. The MME 204 also transmits Session Control messages towards the necessary E-UTRAN nodes to ensure the distribution of content from ongoing MBMS sessions:

FIG. 3 is a message diagram for the example where the cell ID information is provided by the UE devices in the MBMS counting response message.

At transmission 302, an MBMS Service Counting Request with Cell ID information entity (IE) is sent from the MCE 100 to the eNBs. In the interest of clarity and brevity, only two eNBs 81, 82 are shown in FIG. 3. For the example, the MBMS Service Counting Request with Cell ID IE is configured and sent in accordance with at least one 3GPP LTE communication standard and differs from conventional MBMS Service Counting Requests in that is contains the Cell ID IE. The MCE uses the M2 interface to send the Requests 302. For the example, the MBMS Service Counting Request includes the Cell ID IE and PTM compatible service identifiers such as TMGIs. By identifying these parameters, the MCE can gather counting and cell information for the TMGIs and cells of interest. In some situations, the Cell ID IE may be a generic cell identify indicator conveying that the cell ID is being requested for all cell IDs including primary secondary and, in some cases, non-serving cells.

At transmissions 304, 306, each eNB 81, 82 transmits an MBMS Counting Request Message with Cell ID IE to the UE devices that it serves. In response to the MBMS Service Counting Request with Cell ID IE received from the MCE, the first eNB 81 sends the MBMS Counting Request Message with Cell ID IE to all the UE devices receiving service from the first eNB including the first UE device 21. In response to the MBMS Service Counting Request with Cell ID IE received from the MCE, the second eNB 81 sends the MBMS Counting Request Message with Cell ID IE to all the UE devices receiving service from the second eNB 82 including the second UE device 26. The counting request messages 304, 306 are sent over the Single Cell MCCH or SC-MCCH which is transmitted in the PDSCH. It is assumed that the UE device will monitor the PDCCH in order to find the instances where SC-MCCH are transmitted. The SC-MCCH configuration of repetition period, modification period, and change notification are provided to the UE by RRC signaling. Although SC-MCCH for SC-PTM is similar to MCCH transmitted in MBSFN (used for eMBMS), UE devices are not required to monitor MBSFN if it is only interested in receiving broadcast services over SC-PTM. In some situations, the MBMS Counting Request Message with Cell ID IE is sent using MCCH. In such situations, however, the returned cell ID information will not reflect the UE devices that are not using MBSFN to receive service. At transmission 308, the first UE device 21 responds to the MBMS Counting Request Message with MBMS Counting Response Message with Cell ID IE. At transmission 310, the second UE device 26 responds to the MBMS Counting Request Message with MBMS Counting Response Message with Cell ID IE. For the example, if the MBMS Counting Request Message includes the Cell ID IE, the MBMS Counting Response Message includes the Cell ID of the serving cell of the UE device transmitting the response message. As mentioned above, the MBMS Counting Request may include a generic cell identity indicator indicating that the UE device should provide all serving cells (primary and secondary) and, in some cases, accessible non-serving cells. When the Cell ID IE in the MBMS Counting Request includes specific cell IDs, the UE devices only respond with cell IDs for serving cells (and, in some cases accessible non-serving cells) that are identified in the Request. The MBMS Counting Response Message also identifies any PTM compatible services in which the UE device is interested. For the example, the services are identified with TMGIs where the UE device only identifies TMGIs that were included in the MBMS Counting Request message. For the examples herein, the MBMS Counting Response Message does not need to include the Cell ID if the MBMS Counting Request Message does not include the Cell ID IE. In some situations, the UE device does not identify the primary cell of Cell IDs. Since the eNB may know information regarding the cells that the UE device can access, eNB can tag the cell ID information in message 312 and 314 and the proper information can be forwarded to the MCE as long as the UE devices indicate the PTM service of interest, At transmissions 312, 314, the eNBs 81, 82 transmit MBMS Service Counting Results Reports including the cell ID information identifying the cell ID of the UE devices interested in any PTM compatible service. The first eNB 81 and the second eNB 82 each send a MBMS Service Counting Results Report including Cell IDs and TMGIs that identify the TMGIs of the PTM compatible services and the serving cells of the UE devices interested in the PTM compatible service. Accordingly, the MBMS Service Counting Results Reports received by the MCE provide the MCE with the serving cell information 70 for each TMGI.

At event 316, the MCE 100, in conjunction with BM-SC 102, select a transmission mechanism for each PTM compatible service that will be delivered. In some situations, the GCS-AS 104 can be involved in selecting the transmission mechanism. Once the MCE 100 decides that eNB 81 should provide SC-PTM for a TMGI service, the MCE 100 provides the eNB 81 with the necessary information such as the QoS of the TMGI service. Subsequently, the eNB 81 will provide the configuration for SC-MCCH over System Information Block (SIB). The SC-MCCH contains information regarding the services that are broadcasted over SC-PTM and the subframes used to transmit the traffic content for the services. This way the UE device would only need to monitor the specific subframes in PDSCH that are transmitting the traffic content associated with the service of interest.

Figure 4:
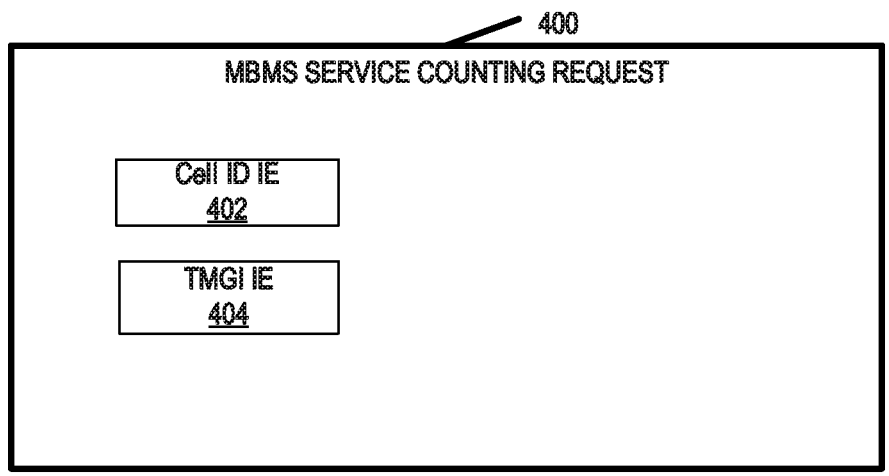
FIG. 4 is a block diagram of an example of an MBMS Service Counting Request with Cell ID IE suitable for use in the example of FIG. 3.

FIG. 4 is a block diagram of an example of an MBMS Service Counting Request 400 suitable for the transmission 302 from the MCE to the eNB in FIG. 3. The MBMS Service Counting Request 400 includes fields and formatting in accordance with at least one revision of the 3GPP LTE communication specification and may include additional fields, IEs, and/or information to the elements discussed herein. The MBMS Service Counting Request 400 includes at least a Cell ID IE 402 and a TMGI IE 404 in the example. As discussed herein, the Cell ID IE 402 may identify one or more cells for which the MCE 100 is interested in obtaining information. As discussed above, the cell ID IE may be a generic identity indicator indicating that the UE devices should provide cell ID information. Also as discussed above, the Cell ID IE may be omitted in some situations. The TMGI IE 402 identifies one or more PTM compatible services for which the MCE 100 is interested in obtaining information.

Figure 5:
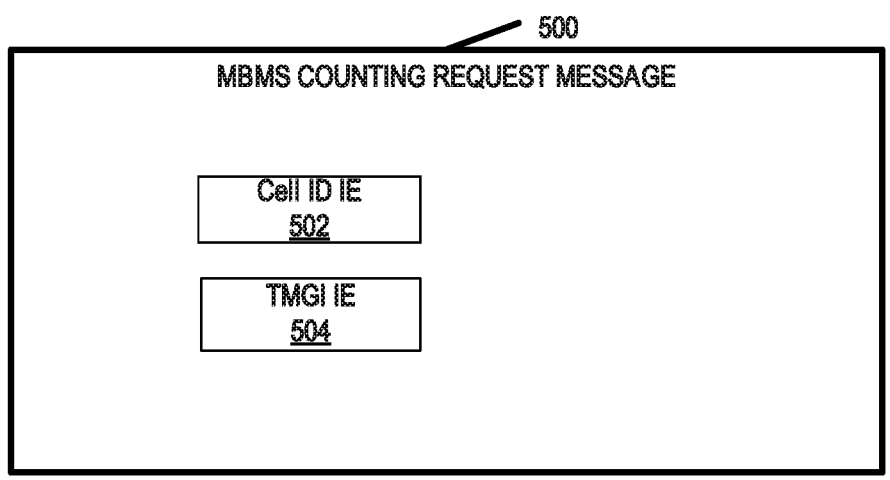
FIG. 5 is a block diagram of an example of an MBMS Counting Request Message with Cell ID IE suitable for use in the example of FIG. 3.

FIG. 5 is a block diagram of an example of an MBMS Counting Request Message 500 suitable for the transmissions 304, 306 from the eNB to the UE devices in FIG. 3. The MBMS Counting Request Message 500 includes fields and formatting in accordance with at least one revision of the 3GPP LTE communication specification and may include additional fields, IEs, and/or information to the elements discussed herein. The MBMS Counting Request Message 500 includes at least a Cell ID IE 502 and a TMGI IE 504 in the example. As discussed herein, the Cell ID IE 502 may identify one or more cells for which the MCE 100 is interested in obtaining information. As discussed above, the cell ID IE may be a generic identity indicator indicating that the UE devices should provide cell ID information. Also as discussed above, the Cell ID IE may be omitted in some situations. The TMGI IE 504 identifies one or more PTM compatible services for which the MCE 100 is interested in obtaining information. The inclusion of a generic cell identity indicator may be based on whether the particular PTM capable service is a currently provided service or if it is service that may be provided in the future. For currently provided services, the MCE 100 must determine whether the service should be continued on a particular cell or not. For this case (the case for ongoing services), the inclusion of the Cell ID in the request messages may still be applicable. For the case when the TMGI service is about to be broadcasted, it is possible that the MCE has not yet identified cells where the service will be provided. In this case, the UE device can just report its current serving cells (primary and secondary cells) and, possibly, accessible non-serving cells as well as the PTM compatible services of interest. The MCE then determines later based on the Results Report which cell or cells are to provide these services.

Figure 6:
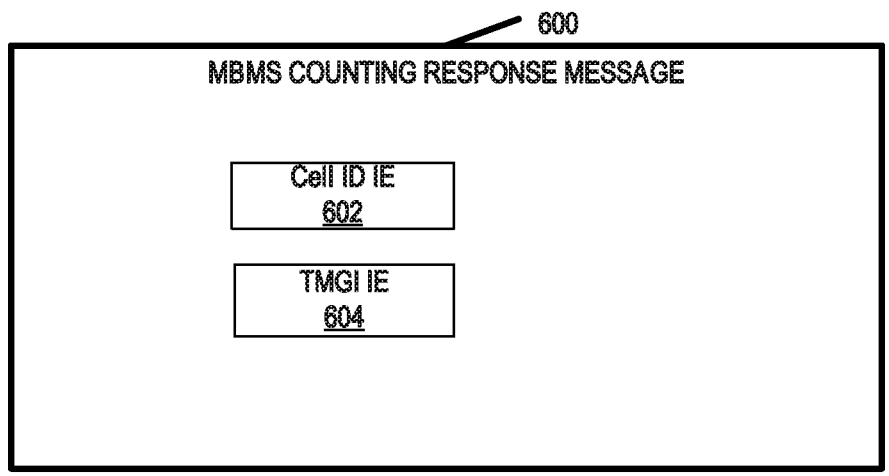
FIG. 6 is a block diagram of an example of an MBMS Counting Response Message with Cell ID IE suitable for use in the example of FIG. 3.

FIG. 6 is a block diagram of an example of an MBMS Counting Response Message 600 suitable for the transmissions 308, 310 from the UE devices to the eNB in FIG. 3. The MBMS Counting Response Message 600 includes fields and formatting in accordance with at least one revision of the 3GPP LTE communication specification and may include additional fields, IEs, and/or information to the elements discussed herein. The MBMS Counting Response Message 600 includes at least a Cell ID IE 602 and a TMGI IE 604 in the example. As discussed herein, the Cell ID IE 602 may identify one or more serving cells of the UE device. As discussed above, the Cell ID IE 602 may also identify the non-serving cells that are accessible by the UE device in some circumstances. For the example, the cells that are identified are the set of cells formed by the intersection of the cells identified in the MBMS Counting Request Message 500 and the cells that are serving cells (and in some cases, accessible non-serving cells) of the UE device. As discussed above, the cell ID IE 502 may be a generic identity indicator indicating that the UE devices should provide cell ID information. As a result, the Cell ID IE 602 may include all of the serving cells and accessible cells of the UE device. For the example, the Cell ID IE is not sent where the cell ID IE 502 is not present in the Request Message 500. As discussed herein, the TMGI 604 may identify one or more PTM compatible services in which the UE device is interested in receiving. For the example, the TMGI 604 is the set of TMGIs that are the intersection of the TMGIs listed in the MBMS Counting Request Message 500 and the TMGIs that the UE device is interested in receiving. Typically, the UE device only sends the MBMS Counting Response Message 600 to its primary cell (PCell), in order to reduce the likelihood of double counting. The secondary cell or SCell for one UE device may serve as the PCell for another UE device.

Figure 7:
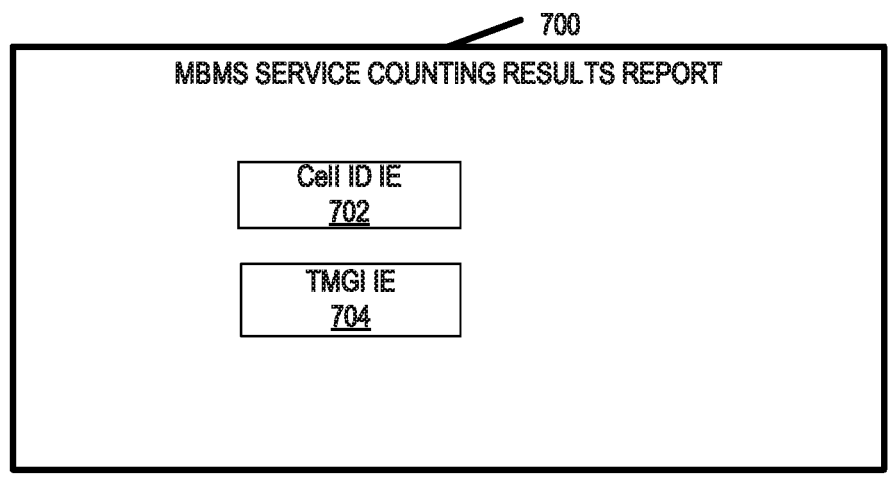
FIG. 7 is a block diagram of an example of an MBMS Service Counting Results Report suitable for use in the example of FIG. 3.

FIG. 7 is a block diagram of an example of an MBMS Service Counting Results Report 700 suitable for the transmissions 312, 314 the eNB to the MCE in FIG. 3. MBMS Service Counting Results Report 700 includes fields and formatting in accordance with at least one revision of the 3GPP LTE communication specification and may include additional fields, IEs, and/or information to the elements discussed herein. The MBMS Service Counting Results Report 700 includes at least a Cell ID IE 702 and a TMGI IE 704 that identify the cells serving UE devices and the number of UE devices that are interested in receiving, and capable of receiving, a specific TMGI in those cells. For the case where there are multiples cells within the Cell ID IE 702, the implication to the MCE is that all the UE devices that form the numbers of UE devices included in the MBMS Service Counting Results Report 700 can obtain the TMGI IE 704 in any one of the cells within the Cell ID IE 702. Hence, the MCE may decide which of the cells to select for PTM transmission in case SC-PTM is selected over MBSFN. As another option, the list of cells under Cell ID IE 702 may be separately identified as a sublist under Cell ID IE 702 to indicate whether a cell is considered as PCell, SCell or non-serving cell to reduce the likelihood of double counting. For the examples herein, a Results Report may include counting information for several TMGIs and Cell IDs. Information can be included that identifies the number of UE devices interested (in each of several cells) that are interested in each PTM service in the Results Report. In one example, the eNB can report one Cell ID for each TMGI and the corresponding number of UEs interesting in that service where it is also possible for the eNB to include a separate record with a second Cell ID corresponding to the same TMGI but listing the number of UEs associated with the second Cell ID.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
    receiving, from a plurality of eNodeBs, cell identification (cell ID) information indicating a serving cell of each of a plurality of user equipment (UE) devices interested in receiving a Point to Multipoint (PTM) compatible service;
    selecting, based on the cell ID information, a transmission mechanism from a plurality of transmission mechanisms to provide the PTM compatible service, the plurality of transmission mechanisms comprising a Multicast Broadcast Single Frequency Network (MBSFN) transmission mechanism and a Single Cell Point To Multipoint (SC-PTM) transmission mechanism.

2. The method of claim 1, wherein the plurality of transmission mechanisms further comprises a Unicast transmission mechanism.

3. The method of claim 1, wherein the selecting comprises:
    determining, for each eNodeB of the plurality of eNodeBs, a number of UE devices served by a cell of the eNodeB that are interested in the PTM compatible service; and
    selecting the transmission mechanism based, at least partially, on the number of UE devices served by the cell of each eNodeB that are interested in the PTM compatible service.

4. The method of claim 3, wherein the cell ID information is received in one or more MBMS Service Counting Results Reports comprising information from one or more MBMS Counting Response Messages transmitted by UE devices interested in receiving the PTM compatible service, each MBMS Counting Response Message comprising a cell ID information element (IE) identifying the serving cell of the UE device.

5. The method of claim 4, further comprising:
    sending a Multimedia Broadcast Multicast Service (MBMS) Counting Request message from each eNodeB requesting the cell ID, wherein each received MBMS Counting Response message including the cell ID IE comprising the cell ID value identifying the serving cell of the UE device transmitting the MBMS Counting Response message is transmitted by the UE device in response to receiving the MBMS Counting Request message.

6. The method of claim 5, wherein cell ID IE identifies a primary serving cell of the UE device transmitting the MBMS Counting Response message and a secondary serving cell.

7. The method of claim 6, wherein cell ID IE further identifies a non-serving cell accessible by the UE device transmitting the MBMS Counting Response message.

8. The method of claim 1, wherein the MBSFN transmission mechanism and the SC-PTM transmission mechanism are in accordance with at least one revision of a 3rd Generation Partnership Project (3GPP) Long Term Evolution (LTE) communication specification.

9. A method performed by a network in a system capable of providing Point to Multiple Point (PTP) compatible services via a Multicast Broadcast Single Frequency Network (MBSFN) transmission mechanism and a Single Cell Point To Multipoint (SC-PTM) transmission mechanism in accordance with at least one revision of a 3rd Generation Partnership Project (3GPP) Long Term Evolution (LTE) communication specification, the method comprising:
    sending a Multimedia Broadcast Multicast Service (MBMS) Service Counting Request to a plurality of eNodeBs that invokes transmission of MBMS Counting Request messages from the eNodeBs, the MBMS Service Counting Request and the MBMS Counting Request messages each comprising a Cell ID information element (Cell ID IE) at least indicating that Cell ID information is requested;
    receiving, from the plurality of eNodeBs, MBMS Service Counting Results Reports comprising cell identification (cell ID) information indicating at least one serving cell of each of a plurality of user equipment (UE) devices interested in receiving a Point to Multipoint (PTM) compatible service; and
    selecting, based on the cell ID information, a transmission mechanism from a MBSFN transmission mechanism and a SC-PTM transmission mechanism.

10. The method of claim 9, wherein the plurality of transmission mechanisms further comprises a Unicast transmission mechanism.

11. The method of claim 9, wherein the Cell ID IE in the MBMS Service Counting Request and the MBMS Counting Request messages identifies at least one cell, the MBMS Service Counting Results Report identifying one or more cells only included in the Cell ID IE.

12. The method of claim 11, wherein the MBMS Service Counting Request and the MBMS Counting Request messages each comprises a Temporary Mobile Group Identity (TMGI) IE identifying at least one PTM compatible service, the MBMS Service Counting Results Report identifying the at least one PTM compatible service.

13. The method of claim 12, wherein the cell ID information identifies a primary serving cell of the UE devices transmitting the MBMS Counting Response messages.

14. The method of claim 13, wherein the cell ID information identifies a secondary serving cell of the UE devices transmitting the MBMS Counting Response messages.

15. The method of claim 14, wherein the cell ID information, for at least one UE device transmitting the MBMS Counting Response Message, identifies a non-serving cell accessible by the at least one UE device transmitting the MBMS Counting Response message.

16. A system capable of providing Point to Multiple Point (PTM) compatible services via a Multicast Broadcast Single Frequency Network (MBSFN) transmission mechanism and a Single Cell Point To Multipoint (SC-PTM) transmission mechanism in accordance with at least one revision of a 3rd Generation Partnership Project (3GPP) Long Term Evolution (LTE) communication specification, the system comprising:
    a plurality of eNodeBs; and
    a network configured to send a Multimedia Broadcast Multicast Service (MBMS) Service Counting Request to the plurality of eNodeBs comprising a Cell ID information element (Cell ID IE) at least indicating that Cell ID information is requested, each of the plurality of eNodeBs configured to transmit MBMS Counting Request messages in response to the (MBMS) Service Counting Request the MBMS Counting Request messages comprising the Cell ID IE at least indicating that Cell ID information is requested, each of the plurality of eNodeBs configured to send MBMS Service Counting Results Reports comprising cell identification (cell ID) information indicating at least one serving cell of each of a plurality of user equipment (UE) devices interested in receiving a Point to Multipoint (PTM) compatible service, the network configured to select based on the cell ID information, a transmission mechanism from a MBSFN transmission mechanism and a SC-PTM transmission mechanism.

17. The system of claim 15, wherein the plurality of transmission mechanisms further comprises a Unicast transmission mechanism.

18. The system of claim 15, wherein the Cell ID IE in the MBMS Service Counting Request and the MBMS Counting Request messages identifies at least one cell, the MBMS Service Counting Results Report identifying one or more cells only included in the Cell ID IE.

19. The system of claim 18, wherein the MBMS Service Counting Request and the MBMS Counting Request messages each comprises a Temporary Mobile Group Identity (TMGI) IE identifying at least one PTM compatible service, the MBMS Service Counting Results Report identifying the at least one PTM compatible service.

20. The system of claim 18, wherein the cell ID information identifies a primary serving cell of the UE devices transmitting the MBMS Counting Response messages.

21. The system of claim 19, wherein the cell ID information identifies a secondary serving cell of the UE devices transmitting the MBMS Counting Response messages.

* * * * *